United States Patent [19]

Marshall

[11] Patent Number: 5,214,358
[45] Date of Patent: May 25, 1993

[54] MOTOR VEHICLES

[75] Inventor: Howard A. Marshall, Leek Woolton, United Kingdom

[73] Assignee: Jaguar Cars Limited, United Kingdom

[21] Appl. No.: 707,638

[22] Filed: May 30, 1991

[30] Foreign Application Priority Data

Jun. 2, 1990 [GB] United Kingdom ............... 9012365

[51] Int. Cl.⁵ ............................................ B60K 41/00
[52] U.S. Cl. .................................... 318/139; 180/65.4
[58] Field of Search ............... 318/139, 150, 161, 254; 180/65.1, 65.2, 65.3, 65.4; 363/15

[56] References Cited

U.S. PATENT DOCUMENTS

| | | | |
|---|---|---|---|
| 4,199,037 | 4/1980 | White | 318/139 X |
| 4,283,968 | 8/1981 | Kalns . | |
| 4,368,411 | 1/1983 | Kidd | 318/254 |
| 4,433,744 | 2/1984 | Muhlbacher . | |
| 4,506,200 | 3/1985 | Datwyler et al. | 318/493 |
| 4,629,947 | 12/1986 | Hammerslag et al. | 318/161 |
| 4,723,079 | 2/1988 | Norton | 307/66 |
| 4,723,105 | 2/1988 | Matouka et al. | 307/16 X |
| 4,916,379 | 4/1990 | Wand et al. | 323/222 |
| 4,920,475 | 4/1990 | Rippel | 363/132 |
| 4,928,227 | 5/1990 | Burba et al. | 180/65.3 |
| 4,951,769 | 8/1990 | Kawamura . | |
| 5,057,763 | 10/1991 | Torii et al. | 322/8 |

FOREIGN PATENT DOCUMENTS 459086 1/1937 United Kingdom .

*Primary Examiner*—Bentsu Ro
*Attorney, Agent, or Firm*—Davis, Bujold & Streck

[57] ABSTRACT

A motor vehicle includes an electromechanical transmission system having an engine driven generator and a motor adapted to drive one or more wheels of the vehicle, the generator being connected to the motor via a DC to DC converter by which the current output of the generator may be varied to provide appropriate current input to the motor and a control unit including a transducer to sense the performance of the vehicle and a speed control device for operation by the driver, said control unit being arranged to control the engine and the DC to DC converter to optimize operation of the transmission to match the requirements of the driver to the performance of the vehicle.

14 Claims, 1 Drawing Sheet

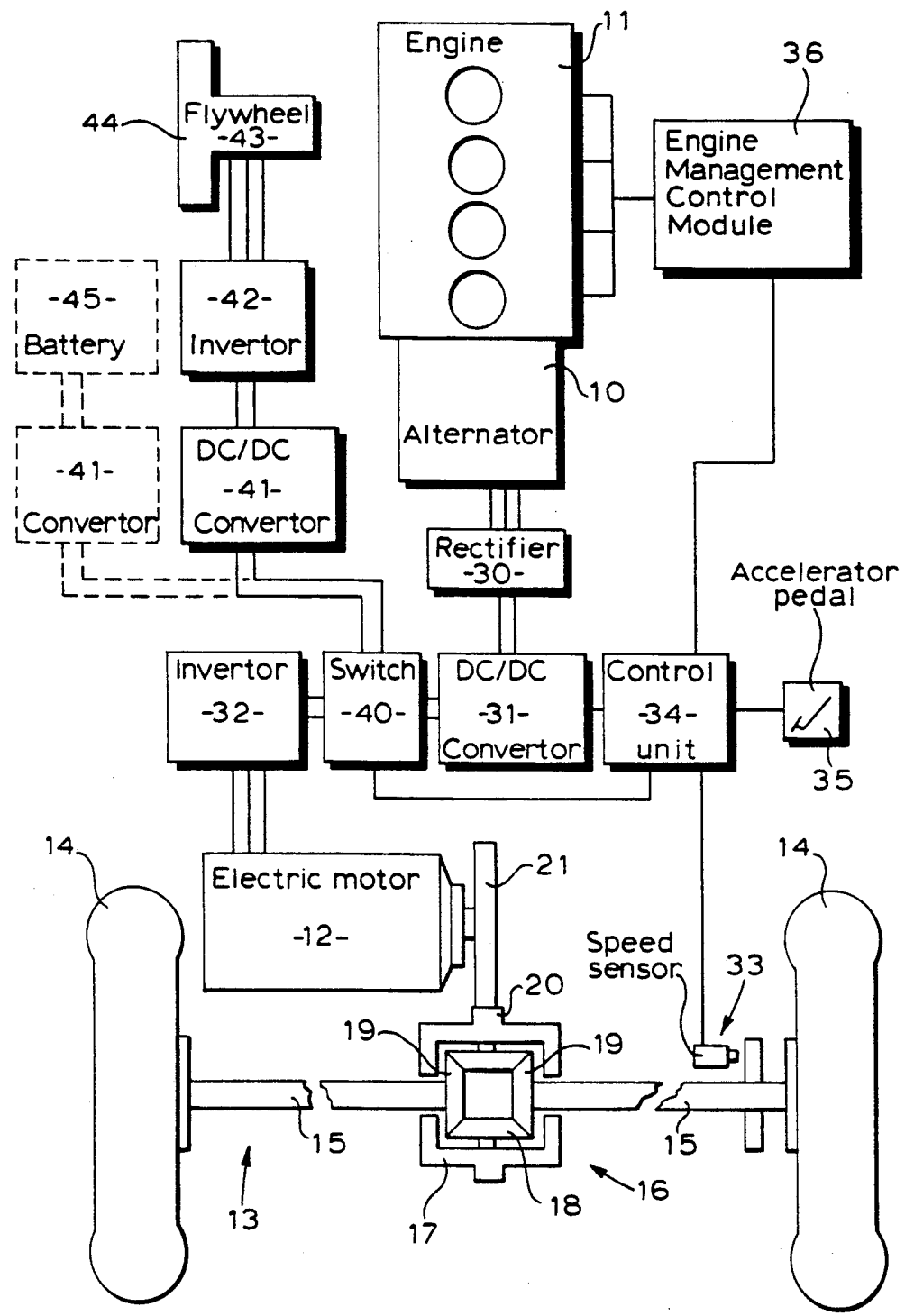

MOTOR VEHICLES

BACKGROUND OF THE INVENTION

The present invention relates to motor vehicles and in particular to electromechanical transmission systems for motor vehicles.

SUMMARY OF THE INVENTION

According to one aspect of the present invention, a motor vehicle includes an electromechanical transmission system comprising an engine driven generator and a motor adapted to drive one or more wheels of the vehicle, the generator being connected to the motor via a DC to DC converter by which the current output of the generator may be varied to provide appropriate current input to the motor, and control means including means to sense the performance of the vehicle and a speed control device for operation by the driver, said control means being arranged to control the engine and the DC to DC converter to optimise operation of the transmission to match the requirements of the driver to the performance of the vehicle.

In accordance with the present invention, for steady speed conditions, the control means will set the DC to DC converter to give the minimum power output to maintain the steady speed and reduce the engine speed to match the power requirement, thus achieving maximum economy. When the driver wishes to accelerate, the speed of the engine is increased to provide additional power depending on the degree of depression of the accelerator pedal, the control means controlling the output from the DC to DC converter so that the output voltage corresponds to the wheel speed while the output current and hence torque generated by the motor is maintained at a maximum for the power input available.

Transmission systems of the present invention may be used to transit power to one or more wheels of the vehicle. With a four wheel vehicle, it would be normal to transmit power to two or all four wheels of the vehicle. This may be achieved by having individual wheel motors driving each wheel directly or one motor may drive a pair of wheels on a common axle. This may be achieved by driving the axle through a conventional differential although preferably the motor will be drivingly connected directly to the cage of a bevel gear differential mechanism, in order to avoid the considerable power losses involved in driving through a hypoid right angle drive.

The DC to DC converter used in accordance with the present invention consists of power switching means and one or more inductances, means being provided to vary the frequency and timing of switching, thereby varying the output voltage and current as desired. Typical DC to DC converters which will fulfill these requirements include: the Buck Boost converter; the McMurray converter and the Cuk Up Down converter details, of which are given in "Power Electronics Converters, Application and Design" by Mohan, Undeland and Robbins, published by Wiley.

Any suitable form of generator which will produce the required power output, may be used in accordance with the present invention. Where the generator produces an alternating current, this must first be rectified before passing to the DC to DC converter. Similarly, any electric motor which will generate the required amount of torque may be used to drive the wheels of the vehicle.

According to a preferred embodiment of the invention, a permanent magnet brushless direct current motor is used for this purpose, the output from the DC to DC converter being converted to alternating current by means of an inverter, the alternating current being used to commutate the brushless direct current motor, electronically.

The electric motor used to drive the wheels of the vehicle may be used as a generator upon braking of the vehicle, in order to charge an auxiliary power source. This auxiliary power source may be in the form of an electric motor coupled to a low mass high inertia composite rim flywheel, which may be hermetically sealed in a vacuum so that it requires no components to maintain the vacuum. Alternatively, the auxiliary power source may be a high power/density battery. The auxiliary power source may provide power to improve acceleration of the vehicle and, in the case of a battery, also provide an alternative source of power for the electric motor.

BRIEF DESCRIPTION OF THE DRAWING

An embodiment of the invention is now described, by way of example only, with reference to the accompanying sole drawing which illustrates diagrammatically the power train of a vehicle formed in accordance with the present invention.

DESCRIPTION OF A PREFERRED EMBODIMENT

As illustrated in the accompanying drawing, a transmission system for a motor vehicle comprises an alternator 10 driven by conventional internal combustion engine 11. A permanent magnet brushless direct current motor 12 is mounted on the vehicle parallel to the rear axle 13, the road wheels 14 being provided at opposite ends of axle 13. The road wheels 14 are connected by drive shafts 15 to a differential unit 16 comprising a cage 17 carrying a plurality of bevelled planet gears 18, the planet gears 18 meshing with bevel gears 19 on each drive shaft 15. A ring gear 20 is provided on the outer diameter of cage 17, the ring gear 20 meshing with a gear 21 drivingly connected to the motor 12, the ratios of gears 20 to 21 being 1:1.

The alternator 10 produces a three phase alternating current which is converted to direct current by means of rectifier 30. The output from rectifier 30 is fed to a DC to DC converter 31, the direct current output from the DC to DC converter 31 being converted to a three phase alternating current supply by inverter 32, to drive the motor 12. A wheel speed transducer 33 is associated with one of the wheels 14 of the vehicle and produces a signal proportional to the wheel speed. The signal from wheel speed transducer 33 is fed to a control unit 34. The control unit 34 also monitors the position of a driver actuated speed control device, for example accelerator pedal 35 controlling an electrical device which produces a signal proportional to the degree of depression of the pedal 35. The control unit 34 produces output signals to control the DC to DC converter 31 and the engine management control module 36.

A typical vehicle with a power train as described above has an engine 11 which develops uniform torque of 127 Nm for speeds of 1000 to 6000 rpm, the alternator 10 develops 0.083 volts per rpm and 1.26 amps per Nm and the motor 12 develops 3.664 rpm per Volt and 2.6 Nm per amp.

As illustrated in Table 1, at steady speeds the control unit 34 will control the speed of the engine 11 by means of the engine management control module 36, to produce sufficient power to maintain the required speed.

When accelerating, the rate of acceleration will depend upon the degree to which the accelerator pedal 35 is depressed by the driver, this controlling the speed and power output of the engine 11 through the engine management control module 36.

Tables 2 and 3 illustrate the instantaneous acceleration from 30 miles per hour, for different levels of power output from the engine 11. As illustrated by Tables 2 and 3, the control unit 34 through the engine management control module 36 controls the speed of the engine 11 in response to the degree of depression of accelerator pedal 35. The DC to DC converter 31, then converts surplus voltage into current which will increase the torque generated by the motor 12, to accelerate the vehicle. As the vehicle accelerates and the speed increases, the voltage required by motor 12 will also increase so that the current available and hence the torque generated by the motor 12 will reduce as the speed of the vehicle increases towards the optimum for that power output of the engine 11.

Optionally, a second DC to DC converter 41 may be connected via a suitable switching means 40, between the DC to DC converter 31 and inverter 32, the DC to DC converter 41 being connected via a second inverter 42 to a motor 43 which drives a low mass high inertia composite rim flywheel 44, the flywheel 44 being located in an evacuated casing.

Under normal driving conditions, the switching means 40 will isolate the DC to DC converter 41, inverter 42 and motor 43 from the main power train. However, upon deceleration or braking, switching means 40 under the control of the control unit 34, will isolate the motor 12 from the main power train and connect the DC to DC converter 41, inverter 42 and motor 43 to the motor 12 via the inverter 32. The motor 12 then acts as a generator producing an alternating current which is rectified by inverter 32, the current is multiplied by the DC to DC converter 41 and converted back to a three phase alternating current by inverter 42 to drive the motor 43 and spin up the flywheel 44. The power thus stored in the flywheel 44 may then be used to drive the motor 43 to provide an auxiliary power supply which may be used to boost the power generated by generator 10 when the vehicle accelerates, the control unit 34 causing switching unit 40 to connect motor 12 to both the main power train and auxiliary power supply. The DC to DC converter 41 will optimise use of the power available from motor 12 when the vehicle is braking or from the motor 43 when the vehicle is accelerating.

Alternatively, as shown in broken line, upon braking of the vehicle, power generated by the motor 12 may be used to charge a high power/energy density battery unit 45 through DC to DC converter 41. The battery unit 45 may, for example, be in the form of a bi-polar lead acid battery having up to 9 Kw per Kg power density. In addition to providing an auxiliary power supply to boost that available for acceleration of the vehicle, an auxiliary power supply of this type may be used to provide an all electric mode of high transmission efficiency, for a limited range.

It will be appreciated that the alternator 10 or generator 10 may also be used as a starter motor for the engine 11.

Various modifications may be made without departing from the invention. For example, while in the embodiments described above, the wheels on a single axle are driven by motor 12, a pair of electric motors similar to motor 12 which, for on a four wheel drive may be run at the same speed, may be used to drive pairs of wheels on different axles through differentials, to provide a four wheel drive vehicle. The control unit 34 may be arranged to control the ratio of power to the front and rear axles as required to suit driving conditions. Alternatively, individual motors may be provided for two or all four wheels of the vehicle.

Although in the above embodiment, the engine 11 is illustrated in the conventional fore aft position, it will be appreciated that the engine 11 may be located in any suitable position in the vehicle. The engine 11 may also be isolated mechanically and acoustically from the vehicle.

While in the above embodiment the DC to DC converter 31 and inverter 32 have been shown as separate units, these may be integrated and possibly built into the motor 12, the windings of the motor 12 being used as inductances for the DC to DC converter 31.

While in the above embodiment a wheel speed transducer is used to measure the vehicle performance, any transducer associated with the mechanical drive train to the wheels may be used for this purpose. For example, the transducer may alternatively measure the speed of the motor 12 or the differential cage 17.

TABLE 1

| Vehicle Speed (MPH) | Engine Power (KW) | Engine Speed (RPM) | Engine Torque (Nm) | Generator Output Voltage (Volts) | Generator Output Current (Amps) | Motor Input Voltage (Volts) | Motor Input Current (Amps) | Wheel Speed (RPM) | Wheel Torque (Nm) |
|---|---|---|---|---|---|---|---|---|---|
| 30 | 5.0 | 750 | 64 | 62.5 | 80 | 125 | 40 | 458 | 105 |
| 60 | 17.0 | 1275 | 127 | 106 | 160 | 250 | 68 | 916 | 177 |
| 90 | 40.0 | 3000 | 127 | 250 | 160 | 375 | 107 | 1374 | 278 |
| 120 | 80.0 | 6000 | 127 | 500 | 160 | 500 | 160 | 1832 | 417 |

TABLE 2

| Engine Power Applied | Engine Speed (RPM) | Engine Torque (Nm) | Generator Output Voltage (Volts) | Generator Output Current (Amps) | Motor Input Voltage (Volts) | Motor Input Current (Amps) | Instantaneous Motor Torque (Nm) |
|---|---|---|---|---|---|---|---|
| 50% | 3000 | 127 | 250 | 160 | 125 | 320 | 834 |
| 75% | 4500 | 127 | 375 | 160 | 125 | 480 | 1251 |
| 100% | 6000 | 127 | 500 | 160 | 125 | 640 | 1668 |

TABLE 3

| Engine Power Available | Resistive Torque (Nm) | Applied Torque (Nm) | Nett Tractive Effort (N) | Instantaneous Acceleration* (M/S$^2$) |
| --- | --- | --- | --- | --- |
| 50% | 105 | 834 | 2603 | 2.17 |
| 75% | 105 | 1251 | 4093 | 3.41 |
| 100% | 105 | 1668 | 5582 | 4.65 |

*For vehicle weighing 1200 kg.

I claim:

1. A motor vehicle including an electromechanical transmission system comprising an engine driven generator and an electric motor adapted to drive one or more wheels of the vehicle, the generator being connected to the motor via a DC to DC converter by which the current output of the generator is varied to provide appropriate current input to the motor, and control means including means for sensing the performance of the vehicle and a speed control device for operation by the driver;

said control means providing signals to control the DC to DC convertor and an engine management control module;

the control means being adapted to set the DC to Dc convertor to give minimum power output to maintain a steady speed and to control the engine management control module to reduce the engine speed to match the power requirement, when operating under steady speed conditions; and the control means being adapted to increase the power out of the engine and to set the DC to DC convertor to provide maximum torque output from the motor at any given speed for the power available, when accelerating.

2. A motor vehicle according to claim 1 in which the speed control device comprises an accelerator pedal controlling an electrical device which will provide a signal proportional to depression of the accelerator pedal.

3. A motor vehicle according to claim 1 in which the means for sensing the performance of the vehicle comprises a transducer associated with a component of the mechanical drive train to the wheels.

4. A motor vehicle according to claim 1 in which the generator comprises an alternator which produces a three phase alternating current supply, the three phase alternating current supply being converted to a direct current supply by means of a rectifier, before being fed to the DC to DC converter.

5. A motor vehicle according to claim 1 in which the motor is a permanent magnet brushless direct current motor, the direct current output of the DC to DC converter being converted to three phase alternating current by means of an inverter to drive the motor.

6. A motor vehicle according to claim 1 in which one or more wheels of the vehicle are driven by independent motors.

7. A motor vehicle according to claim 1 in which a single motor drives a pair of wheels on a common axle, the motor driving through a differential unit.

8. A motor vehicle according to claim 7 in which the motor is disposed parallel to the axle, the motor being drivingly connected to the cage of a bevel gear differential mechanism by which the wheels are driven.

9. A motor vehicle according to claim 8 in which a gear driven directly by the electric motor engages a gear ring on the outer diameter of the cage of the differential mechanism.

10. A motor vehicle according to claim 1 in which the motor is selectively connected to the generator or an auxiliary power source through switching means, so that upon deceleration or braking of the vehicle, the motor may be connected to the auxiliary power source and current generated by the motor be used to charge the auxiliary power source.

11. A motor vehicle according to claim 10 in which the auxiliary power source comprises a secondary electric motor coupled to a low mass/high inertia composite flywheel.

12. A motor vehicle according to claim 10 in which the auxiliary power source is a high power/density battery.

13. A motor vehicle according to claim 10 in which the auxiliary power source is connected to the motor via a second DC to DC converter which will optimise use of the power supplied to or from the auxiliary power source.

14. A motor vehicle according to claim 10 in which the switching means is controlled by the control means to connect the generator to the motor while isolating the auxiliary power source from the motor, during normal operation; isolate the generator from the motor while connecting the auxiliary power source to the motor, under deceleration or braking of the vehicle; and connect both the generator and auxiliary power source to the motor under re-acceleration of the vehicle.

* * * * *